United States Patent
Erfurt et al.

(10) Patent No.: US 11,297,341 B2
(45) Date of Patent: Apr. 5, 2022

(54) ADAPTIVE IN-LOOP FILTER WITH MULTIPLE FEATURE-BASED CLASSIFICATIONS

(71) Applicant: Fraunhofer-Gesellschaft zur Foerderung der angewandten Forschung e.V., Munich (DE)

(72) Inventors: Johannes Erfurt, Berlin (DE); Lim Wang-Q, Berlin (DE); Mischa Siekmann, Berlin (DE); Heiko Schwarz, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/986,670

(22) Filed: Aug. 6, 2020

(65) Prior Publication Data

US 2020/0366918 A1    Nov. 19, 2020

Related U.S. Application Data

(63) Continuation of application No. PCT/EP2019/052797, filed on Feb. 5, 2019.

(30) Foreign Application Priority Data

Feb. 9, 2018   (EP) .................................. 18156183

(51) Int. Cl.
*H04N 19/176* (2014.01)
*H04N 19/567* (2014.01)
(Continued)

(52) U.S. Cl.
CPC ........... *H04N 19/44* (2014.11); *G06K 9/6267* (2013.01); *H04N 19/176* (2014.11); *H04N 19/567* (2014.11)

(58) Field of Classification Search
CPC ............................. H04N 19/44; H04N 19/176
See application file for complete search history.

(56) References Cited

U.S. PATENT DOCUMENTS 9,596,461 B2 *   3/2017   Chong ................. H04N 19/196
10,057,574 B2 *  8/2018   Li ........................ H04N 19/593
(Continued)

FOREIGN PATENT DOCUMENTS

EP          3139616 A1     3/2017

OTHER PUBLICATIONS

Albrecht, M, et al., "Description of SDR, HDR and 360 video coding technology proposal by Fraunhofer", HHI 10. JVET Meeting; Oct. 4, 2018-Apr. 20, 2018; San Diego; (The Joint Video Exploration Teamof ISO/IEC JTC1/SC29/WG11 and ITU-T SG16); URL; http://phenix.int-evry.fr/jvet/,, No. JVET-J0014, Apr. 2, 2018 XP 030151172,, p. 55-p. 56.

(Continued)

*Primary Examiner* — Irfan Habib
(74) *Attorney, Agent, or Firm* — Perkins Coie LLP; Michael A. Glenn

(57) ABSTRACT

A decoder is described, which receives an encoded data stream. The encoded data stream includes data representing a picture and a classification mode parameter. The classification mode parameter specifies a certain classification to be applied to samples in the picture, the certain classification selected from a plurality of classifications. The decoder decodes the encoded data stream to obtain a reconstructed picture and the classification mode parameter, classifies samples of the reconstructed picture into one of a plurality (Continued)

of classes using the certain classification specified by the classification mode parameter, and filters the samples of the reconstructed picture. A sample is filtered using a filter for the class into which the sample has been classified.

17 Claims, 5 Drawing Sheets

(51) Int. Cl.
*G06K 9/62* (2006.01)
*H04N 19/44* (2014.01)

(56) References Cited

U.S. PATENT DOCUMENTS

| | | | |
|---|---|---|---|
| 10,212,425 B2* | 2/2019 | Matsunobu | A61M 1/74 |
| 10,841,581 B2* | 11/2020 | Ramamurthy | H04N 19/124 |
| 2011/0274158 A1* | 11/2011 | Fu | H04N 19/439 |
| | | | 375/240.02 |
| 2012/0287988 A1* | 11/2012 | Chong | H04N 19/167 |
| | | | 375/240.02 |
| 2013/0094569 A1* | 4/2013 | Chong | H04N 19/82 |
| | | | 375/240.02 |
| 2014/0321552 A1* | 10/2014 | He | H04N 19/192 |
| | | | 375/240.16 |
| 2015/0124869 A1* | 5/2015 | Fu | H04N 19/14 |
| | | | 375/240.02 |
| 2015/0172678 A1* | 6/2015 | Alshina | H04N 19/117 |
| | | | 375/240.02 |
| 2017/0041638 A1* | 2/2017 | Fu | H04N 19/70 |
| 2018/0184123 A1* | 6/2018 | Terada | H04N 19/109 |
| 2018/0352225 A1* | 12/2018 | Guo | H04N 19/136 |
| 2019/0104307 A1* | 4/2019 | Mei | H04N 19/172 |

OTHER PUBLICATIONS

Fu, Chih-Ming, et al., "Sample Adaptive Offset in the HEVC Standard", IEEE Trans. Circuits Syst. Video Technol. 22 (2012) No. 12.

Karczewicz, M, et al., "Geometry transformation-based adaptive in-loop filter", Picture Coding Symposium (PCS), 2016.

Lim, Wang-Q, et al., "CE 2.4.2.1: Multiple-feature based adaptive loop filter", Jul. 16, 2018-Jul. 20, 2018; Ljubjana; (Motion Picture Expert Group or ISO/IEC JTC/SC29/WG11) No. m43217 2; XP 030195710,Retrieved from the Internet, URL: http://phenix.intevry.fr/mpeg/doc_end_user/documents/123_Ljubljana/wg11/m43217-JVET-K0285-v1.zip JVET-K0285.docx retrieved on Jul. 2, 2018, p. 1-p. 7.

List, Peter, et al., "Adaptive Deblocking Filter", IEEE Trans. Circuits Syst. Video Technol. 13 (2003), No. 7.

Tsai, Chia-Yang, et al., "Adaptive Loop Filtering for Video Coding", IEEE J. Sel. Topics Signal Process 7 (2013), No. 6.

* cited by examiner

ADAPTIVE IN-LOOP FILTER WITH MULTIPLE FEATURE-BASED CLASSIFICATIONS

CROSS-REFERENCE TO RELATED APPLICATIONS

This application is a continuation of copending International Application No. PCT/EP2019/052797, filed Feb. 5, 2019, which is incorporated herein by reference in its entirety, and additionally claims priority from European Application No. 18156183.8, filed Feb. 9, 2018, which is also incorporated herein by reference in its entirety.

BACKGROUND OF THE INVENTION

The present invention relates to the field of encoding/decoding pictures, images or videos. Embodiments of the inventive approach concern an improvement of an image reconstructed from received encoded data using a classification selected from a plurality of available classifications and determined to be especially suited for improving the reconstructed image. More specific embodiments of the inventive approach relate to a Wiener-based adaptive filter combined with a geometric transformation-based adaptive in-loop filter, GALF, to improve compression performance while only marginally increasing complexity compared to GALF.

In video coding, in-loop filtering has emerged as an important module due to its significant improvement on the compression performance. Initially, video coding standards adopted as in-loop filter a deblocking filter, DBF, to reduce blocking artifacts, as it is described in reference [1]. The high efficient video coding, HEVC, standard adopts a further non-linear in-loop filter, referred to as sample adaptive offset, SAO, filter to reduce coding artifacts following the DBF, as is described in reference [2]. In addition, an adaptive loop filter, ALF, as described in reference [3] is provided as a third stage in the in-loop filter following the SAO filter. The adaptive loop filter may be a Wiener-based adaptive filter for minimizing a mean square error between original samples and reconstructed samples obtained from the SAO filter. A further development of the ALF is referred to as geometric transformation-based adaptive in-loop filter, GALF, which further improves the existing ALF techniques.

In accordance with the GALF approach, one or more Wiener filters $F_\ell$ are estimated at the encoder by minimizing the mean square error, MSE, between original samples and reconstructed samples from an original image or picture and from a reconstructed image or picture, respectively. In a first step, each sample location (i,j), also referred to as pixel location, is classified into one of L classes $C_1, \ldots, C_L$. Each Wiener filter $F_\ell$ which corresponds to the class $C_\ell$ is applied for a reconstructed image Y, also referred to as a reconstructed frame, at each pixel location which is a member of the respective class, i.e., $(i,j) \in C_\ell$. At the encoder side, each Wiener filter $F_\ell$ associated with the class $C_\ell$ is computed or determined so as to minimize the MSE between the original and decoded samples over $(i,j) \in C_\ell$. Following this, at the decoder side, the reconstructed frame Y may be filtered which results in the filtered, reconstructed frame $\tilde{X}$ as follows:

$$\tilde{X} = \sum_{\ell=1}^{L} \mathcal{X}_{C_\ell} \cdot (Y * F_\ell) \quad (1)$$

where $\mathcal{X}_{C_\ell}$ ee is the characteristic function defined by $$\mathcal{X}_{C_\ell}(i,j) = \begin{cases} 1, & \text{if } (i,j) \in C_\ell \\ 0, & \text{otherwise} \end{cases}$$

The conventional approach using, for example, a Wiener-based adaptive filter as described above uses only one specific classifier for the GALF approach, thereby limiting the possibilities for reducing errors between an original picture and a reconstructed picture.

It is an object of the present invention to provide an improved approach for further reducing errors between an original picture and a reconstructed picture when using in-loop filtering of picture data or video data, thereby improving, e.g., compression performance while only marginally increasing complexity of the process.

SUMMARY

An embodiment may have a decoder, wherein the decoder is configured to receive an encoded data stream, the encoded data stream including data representing a picture and a classification mode parameter, the classification mode parameter specifying a certain classification to be applied to samples in the picture, the certain classification selected from a plurality of classifications, and wherein the decoder is configured to decode the encoded data stream to obtain a reconstructed picture and the classification mode parameter, to classify samples of the reconstructed picture into one of a plurality of classes using the certain classification specified by the classification mode parameter, and to filter samples of the reconstructed picture, a sample being filtered using a filter for the class into which the sample has been classified.

Another embodiment may have an encoder, wherein the encoder is configured to receive an original picture, to process the original picture prior to encoding, and to encode the processed picture into a data stream, wherein the encoder is configured to obtain, using the processed picture, a reconstructed picture, to perform a plurality of different classifications on samples of the reconstructed picture, and to select from the plurality of different classifications a specific classification which yields the best performance among the plurality of different classifications, and wherein the encoder is configured to encode into the data stream a classification mode parameter, the classification mode parameter indicating the specific classification to be applied to samples in the picture.

Still another embodiment may have a data stream having a picture encoded thereinto, the data stream further having a classification mode parameter encoded thereinto, the classification mode parameter specifying a certain classification to be applied at a decoder to samples in the decoded picture, the certain classification selected from a plurality of classifications.

According to another embodiment, a method may have the steps of: receiving an encoded data stream, the encoded data stream including data representing a picture and a classification mode parameter, the classification mode parameter specifying a certain classification to be applied to samples in the picture, the certain classification selected from a plurality of classifications, decoding the encoded data stream to obtain a reconstructed picture and the classification mode parameter, classifying samples of the reconstructed picture into one of a plurality of classes using the certain classification specified by the classification mode parameter, and filtering samples of the reconstructed picture, a sample being filtered using a filter for the class into which the sample has been classified.

Another embodiment may have a method having the steps of: receiving an original picture, processing the original picture prior to encoding, encoding the processed picture into a data stream, obtaining, using the processed picture, a reconstructed picture, performing a plurality of different classifications on samples of the reconstructed picture, and selecting from the plurality of different classifications a specific classification which yields the best performance among the plurality of different classifications, wherein a classification mode parameter is encoded into the data stream, the classification mode parameter indicating the specific classification to be applied to samples in the picture.

Still another embodiment may have a non-transitory digital storage medium having stored thereon a computer program for performing a method having the steps of: receiving an encoded data stream, the encoded data stream including data representing a picture and a classification mode parameter, the classification mode parameter specifying a certain classification to be applied to samples in the picture, the certain classification selected from a plurality of classifications, decoding the encoded data stream to obtain a reconstructed picture and the classification mode parameter, classifying samples of the reconstructed picture into one of a plurality of classes using the certain classification specified by the classification mode parameter, and filtering samples of the reconstructed picture, a sample being filtered using a filter for the class into which the sample has been classified, when said computer program is run by a computer.

Another embodiment may have a non-transitory digital storage medium having stored thereon a computer program for performing a method having the steps of: receiving an original picture, processing the original picture prior to encoding, encoding the processed picture into a data stream, obtaining, using the processed picture, a reconstructed picture, performing a plurality of different classifications on samples of the reconstructed picture, and selecting from the plurality of different classifications a specific classification which yields the best performance among the plurality of different classifications, wherein a classification mode parameter is encoded into the data stream, the classification mode parameter indicating the specific classification to be applied to samples in the picture, when said computer program is run by a computer.

BRIEF DESCRIPTION OF THE DRAWINGS

Embodiments of the present invention are now described in further detail with reference to the accompanying drawings, in which.

DETAILED DESCRIPTION OF THE INVENTION

Figure 1:
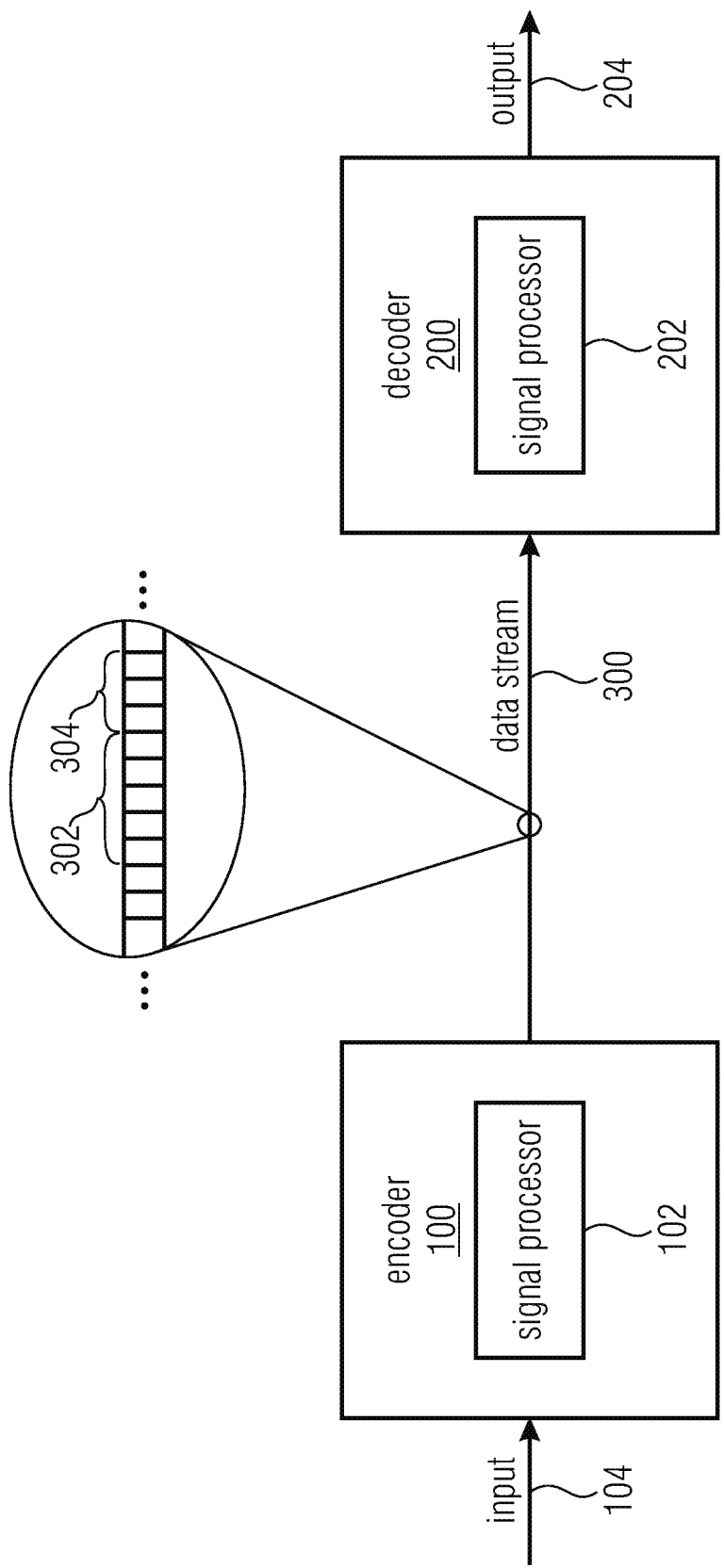
FIG. 1 is a schematic representation of a system for transferring picture or video data from a transmitter to a receiver in accordance with embodiments of the present invention.

Embodiments of the present invention are now described in more detail with reference to the accompanying drawings in which the same or similar elements have the same reference signs assigned.

Decoder

The present invention provides a decoder, wherein the decoder is configured to receive an encoded data stream, the encoded data stream including data representing a picture and a classification mode parameter, the classification mode parameter specifying a certain classification to be applied to samples in the picture, the certain classification selected from a plurality of classifications, and wherein the decoder is configured to decode the encoded data stream to obtain a reconstructed picture and the classification mode parameter, to classify samples of the reconstructed picture into one of a plurality of classes using the certain classification specified by the classification mode parameter, and to filter samples of the reconstructed picture, a sample being filtered using a filter for the class into which the sample has been classified.

The present invention provides a method, comprising receiving an encoded data stream, the encoded data stream including data representing a picture and a classification mode parameter, the classification mode parameter specifying a certain classification to be applied to samples in the picture, the certain classification selected from a plurality of classifications, decoding the encoded data stream to obtain a reconstructed picture and the classification mode parameter, classifying samples of the reconstructed picture into one of a plurality of classes using the certain classification specified by the classification mode parameter, and filtering samples of the reconstructed picture, a sample being filtered using a filter for the class into which the sample has been classified.

In accordance with embodiments of the present invention, the classification mode parameter specifies one or more feature descriptors used for the classification of samples of the reconstructed picture.

In accordance with embodiments of the present invention, a plurality of feature descriptors ($D_1, D_2, \ldots$) are combined, each feature descriptor ($D_1, D_2, \ldots$) classifying samples of the reconstructed picture into a respective number of classes ($K_1, K_2, \ldots$).

In accordance with embodiments of the present invention, the combined feature descriptor is defined as follows:

$$D_1 = I \to \{1, \ldots K_1\}$$
$$D_2 = I \to \{1, \ldots K_2\}$$
$$\vdots$$
$$D_n = I \to \{1, \ldots K_n\}$$
$$D(i, j) = (D_1(i, j), D_2(i, j), \ldots, D_n(i, j)) \in$$
$$\{1, \ldots K_1\} \times \{1, \ldots K_2\} \times \ldots \times \{1, \ldots K_n\}$$

where
D(i,j)=combined feature descriptor for sample (i,j) as specified by the classification mode parameter,
$D_n$=feature descriptor n
$K_n$=the number of classes of feature descriptor n,
i,j=sample location.

In accordance with embodiments of the present invention, a feature descriptor describes a predefined feature of a sample and comprises one or more of:
(i) a Laplacian feature descriptor ($D_L$), which is a Laplacian activity-based descriptor,
(ii) a sample based feature descriptor ($D_P$), and
(iii) a ranking based feature descriptor ($D_R$).

In accordance with embodiments of the present invention, the sample based feature descriptor ($D_P$) takes quantized sample values of the reconstructed picture as follows:

$$D_P(i,j) = \left\lfloor \frac{(K-1)}{2^B} Y(i,j) \right\rfloor$$

where
$D_P(i,j)$=the sample based feature descriptor for sample (i,j),
Y(i,j)=the sample (i,j) in the reconstructed picture,
K=the number of classes,
B=the input bit depth,
i,j=sample location.

In accordance with embodiments of the present invention, the ranking based feature descriptor ($D_R$) ranks a sample value in order of its magnitude compared to its neighboring samples as follows:

$$D_R(i,j) = |\{(k_1,k_2): Y(i,j) < Y(k_1,k_2) \text{ for } |k_1-i| \leq l, |k_2-j| \leq h\}|$$

where
$D_R(i,j)$=the ranking based feature descriptor for sample (i,j),
Y(i,j)=the sample (i,j) in the reconstructed picture,
$k_1,k_2$=neighboring samples locations,
l,h=width and height of the neighborhood around the sample (i,j) in the reconstructed picture
i,j=sample location.

In accordance with embodiments of the present invention, the decoder is configured to parse from the encoded data stream the classification mode parameter and to perform the classification of the samples so that:

$$C_\ell = \{(i,j) \in I: D(i,j) = \ell\} \text{ for } \ell = 1, \ldots, K$$

where
$C_\ell$=set of samples in class $\ell$,
I=set of all sample locations in the reconstructed picture,
D(i,j)=feature descriptor for sample (i,j) as specified by the classification mode parameter,
K=the number of classes,
i,j=sample location.

In accordance with embodiments of the present invention, the encoded data stream further includes data representing the confidence level associated with a feature descriptor specified by the classification mode parameter, and the decoder is configured to obtain from the encoded data stream the confidence level, wherein the confidence level indicates for the feature descriptor that a sample location is classified into one estimation classes with a confidence or probability exceeding a predefined threshold.

In accordance with embodiments of the present invention, the decoder is configured
to pre-classify each sample location (i,j) into respective pre-classes ($C_1^{pre}, \ldots, C_K^{pre}$) using the feature descriptor D, wherein D(i,j)=k indicates that the sample location i,j belongs to pre-class $C_k^{pre}$, and
to determine, based on the confidence level, whether a pre-class is a subset of one estimation class,
wherein samples of the reconstructed picture, which belong to a pre-class being a subset of one estimation class, are filtered.

In accordance with embodiments of the present invention, the confidence level is signaled using a parameter vector specifying for each pre-class of the feature descriptor with the confidence level one of N states, N being one more than the number of estimation classes, and the states indicating whether a pre-class is a subset of one estimation class or not.

In accordance with embodiments of the present invention, the decoder is configured to perform the classification of the samples using the feature descriptor with the confidence level into respective estimation classes so that:

$$C_\ell^e = \{(i,j) \in I: P(D(i,j)) = \ell\} \text{ for } \ell = 1, 2, \ldots, n$$

where
$C_\ell^e$=set of samples in estimation class $\ell$,
I=set of all sample locations in the reconstructed picture,
D(i,j)=feature descriptor for sample location (i,j) as specified by the classification mode parameter,
P(D(i,j))=state signaled by parameter vector for sample location (i,j),
n=the number of estimation classes,
i,j=sample location.

In accordance with embodiments of the present invention, samples of the reconstructed picture, which belong to a pre-class not being one of the estimation classes, are filtered using default filters or filters derived from a further classification.

In accordance with embodiments of the present invention, in case samples of the reconstructed picture, which belong to a pre-class not being one of the estimation classes, are filtered using filters derived from a further classification, the classification mode parameter specifies at least one further feature descriptor for classifying sample locations not belonging to one estimation class.

In accordance with embodiments of the present invention, the decoder is configured to perform the classification for sample locations not belonging to one estimation class using the further feature descriptor so that:

$$C_\ell = \{(i,j) \notin C_1^e \cup C_2^e \cup \ldots \cup C_n^e \cup : \tilde{D}(i,j) = \ell\} \text{ for } \ell = 1, \ldots, K$$

where
$C_\ell$=set of samples in class $\ell$,
$C_\ell^e$=estimation class,
I=set of all sample locations in the reconstructed picture,
$\tilde{D}(i,j)$=further feature descriptor for sample (i,j) as specified by the classification mode parameter,
K=the number of classes,
i,j=sample location.

In accordance with embodiments of the present invention, one or more feature descriptors and their associated confidence levels are specified.

In accordance with embodiments of the present invention, the feature descriptor with the confidence level and the further feature descriptor comprise different feature descriptors.

In accordance with embodiments of the present invention, the encoded data stream includes data representing filter coefficients for the filters used for filtering the samples, and the decoder is configured to decode the encoded data stream to obtain the filter coefficients and to filter the samples of the picture using the obtained filter coefficients.

In accordance with embodiments of the present invention, the decoder is a video decoder, e.g., a block based and predictive video decoder.

In accordance with embodiments of the present invention, the decoder comprises an entropy decoder, a dequantizer and inverse transformer coupled to an output of the entropy decoder, an in-loop filter coupled to an output of the dequantizer and inverse transformer and providing the filtered reconstructed picture, a combiner coupled between the dequantizer and inverse transformer and the in-loop filter, and a prediction module coupled between the output of the in-loop filter and the combiner.

In accordance with embodiments of the present invention, the prediction module includes a decoded picture buffer coupled to the output of the in-loop filter to receive the filtered reconstructed picture as an input for the prediction loop.

Encoder

The present invention provides an encoder, wherein the encoder is configured to receive an original picture, to process the original picture prior to encoding, and to encode the processed picture into a data stream, wherein the encoder is configured to obtain, using the processed picture, a reconstructed picture, to perform a plurality of different classifications on samples of the reconstructed picture, and to select from the plurality of different classifications a specific classification which yields the best performance among the plurality of different classifications, and wherein the encoder is configured to encode into the data stream a classification mode parameter, the classification mode parameter indicating the specific classification to be applied to samples in the picture.

The present invention provides a method, comprising receiving an original picture, processing the original picture prior to encoding, encoding the processed picture into a data stream, obtaining, using the processed picture, a reconstructed picture, performing a plurality of different classifications on samples of the reconstructed picture, and selecting from the plurality of different classifications a specific classification which yields the best performance among the plurality of different classifications, wherein a classification mode parameter is encoded into the data stream, the classification mode parameter indicating the specific classification to be applied to samples in the picture.

In accordance with embodiments of the present invention, the classification mode parameter specifies one or more feature descriptors used for the classification of samples of the reconstructed picture.

In accordance with embodiments of the present invention, a feature descriptor describes a predefined feature of a sample and comprises one or more of:
(i) a Laplacian feature descriptor ($D_L$), which is a Laplacian activity-based descriptor,
(ii) a sample based feature descriptor ($D_P$), and
(iii) ranking based feature descriptor ($D_R$).

In accordance with embodiments of the present invention, the selected classification uses a feature descriptor with a confidence level, the confidence level indicating for the feature descriptor that a sample location is classified into one estimation class with a confidence or probability exceeding a predefined threshold.

In accordance with embodiments of the present invention, the encoder is configured to determine the confidence level dependent on how accurately the feature descriptor identifies sample locations in the reconstructed picture to belong to one of the ideal classes.

In accordance with embodiments of the present invention, the encoder is configured to encode into the data stream a parameter vector specifying for each class of the feature descriptor with the confidence level one of N states, N being one more than the number of estimation classes, and the states indicating whether a sample location is classified into one estimation class or not.

In accordance with embodiments of the present invention, n ideal classes ($\tilde{C}_1, \ldots, \tilde{C}_n$) are selected,
the encoder is configured to determine the confidence level of the feature descriptor which is applied for the reconstructed picture (Y) at each sample location (i,j) as follows:

$$p_{k,1} = \frac{|C_k^{pre} \cap \tilde{C}_1|}{|C_k^{pre}|}, p_{k,2} = \frac{|C_k^{pre} \cap \tilde{C}_2|}{|C_k^{pre}|}, \ldots, p_{k,n} = \frac{|C_k^{pre} \cap \tilde{C}_n|}{|C_k^{pre}|},$$

where
$p_{k,1}, \ldots, p_{k,n}$=confidence level of the feature descriptor D
k=1, 2, . . . , K
K=the number of classes provided by the feature descriptor D,
$C_k^{re}$ pre-class into which each sample location i,j is classified using the feature descriptor, wherein D(i,j)=k indicates that the sample location i,j is belongs to class $C_k^{pre}$, and
the encoder is configured to determine the parameter vector as follows:

$(P_D(1), \ldots, P_D(K))$ where $$P_D(k) = \begin{cases} 1 & p_{k,1} > p \\ & \vdots \\ n & p_{k,n} > p \\ 0 & \text{otherwise} \end{cases}$$

p=the predefined threshold, like fixed positive constant, e.g., p∈(0.5/1).

In accordance with embodiments of the present invention, n=2 ideal classes ($\tilde{C}_1, \tilde{C}_2$) are selected as follows:

$\tilde{C}_1 = \{(i,j) \in I: Y(i,j) \leq X(i,j)\}$ $\tilde{C}_2 = \{(i,j) \in I: Y(i,j) > X(i,j)\}$ where I is the set of all pixel locations, (i,j) is the sample location, and X and Y are the processed picture and the reconstructed picture, respectively—

In accordance with embodiments of the present invention, the encoder is configured to select one or more feature descriptors and their associated confidence levels.

In accordance with embodiments of the present invention, the encoder is configured to select at least one further feature descriptor not having associated therewith a confidence level, the further feature descriptor classifying sample locations not belonging to one estimation class.

In accordance with embodiments of the present invention, the encoder is configured to determine filters to filter samples of the reconstructed picture, a sample being filtered using a filter for the class into which the sample has been classified, and to encode filter coefficients for the filters into the data stream.

In accordance with embodiments of the present invention, the encoder is configured to perform one or more of the following: use a temporal prediction of previously coded filter coefficients so that the coded filter coefficients are from one or more previously coded pictures, or apply a class merging algorithm to find the best grouping of classes by trying different versions of merging neighbors, e.g., based on a rate-distortion-optimization (RDO) process, so that the number of filters for all classes is between one filter shared by all classes, and one filter for each class, or in case temporal prediction is not available, like for intra frames, assign a set of predefined filters to each class, the predefined filters may be obtained with off-line training, and to signal the use of a predefined filter, e.g., by a flag, and an index of the chosen predefined filter, wherein for different classifiers different sets of predefined filters may be used so that even when the predefined filter is selected for a given class, the coefficient differences between the chosen fixed filter and the desired adaptive filter may be signaled.

In accordance with embodiments of the present invention, the encoder is a video decoder, e.g., a block based and predictive video encoder.

In accordance with embodiments of the present invention, the encoder comprises a quantizer and transformer coupled to an input to receive the picture, an entropy encoder providing the encoded picture and being coupled to an output of the quantizer and transformer, a dequantizer and inverse transformer coupled to the output of the quantizer and transformer, an in-loop filter coupled to an output of the dequantizer and inverse transformer and providing the filtered reconstructed picture, the in-loop filter further coupled to the entropy encoder to provide information for encoding the classification mode parameter into the data stream, a combiner coupled between the dequantizer and inverse transformer and the in-loop filter, a prediction residual signal former coupled between the input and the quantizer and transformer, and a prediction module coupled between the output of the in-loop filter, the combiner and the prediction residual signal former.

In accordance with embodiments of the present invention, the prediction module includes a picture buffer coupled to the output of the in-loop filter to receive the filtered reconstructed picture as an input for the prediction loop.

Data Stream

The present invention provides a data stream having a picture encoded thereinto, the data stream further having a classification mode parameter encoded thereinto, the classification mode parameter specifying a certain classification to be applied at a decoder to samples in the decoded picture, the certain classification selected from a plurality of classifications.

In accordance with embodiments of the present invention, the picture is encoded into the data stream by use of predictive coding and spatial-to-spectral transform coding of a prediction residual signal.

Computer Program Product

The present invention provides a computer program product comprising instructions which, when the program is executed by a computer, cause the computer to carry out the one or more methods of in accordance with the present invention.

As mentioned above, the conventional approach using, for example, a Wiener-based adaptive filter applies only one specific classifier for the GALF approach, however, the inventors of the present invention recognized that the one specific classifier currently used for performing the GALF approach may not be the optimum choice given the nature of the picture or image to be processed, rather, the inventors found that there may be other classifiers available which may provide a better performance.

Therefore, in accordance with the inventive approach, rather than relying on a single classifier used for the in-loop filtering, a plurality of different classifications are considered and one specific classification is chosen from among the available different classifications is used. In other words, at the encoder, for example, M different classifications may be available and each of these classifications may be considered in terms of how effective errors between original samples and reconstructed samples in the image may be corrected using the respective classification. Then, the one classification, namely the specific classification which provides the best results, may be selected at the encoder and the information about the classification selected is signaled, together with the actual image data, to the decoder. At the decoder the specifically selected and optimized classification for processing the received picture or image may be applied.

Stated differently, in accordance with the inventive approach, a multiple feature-based classifiers may be used instead of only one specific classifier as it is, for example, currently applied in the GALF technique. For example, in accordance with the inventive approach, for each classifier, which may provide respective classes $C_1, \ldots, C_L$, each pixel location (i,j) is classified into one of the classes $C_1, \ldots, C_L$, and then the corresponding filters, for example Wiener filters, $F_1, \ldots, F_L$ are applied so as to obtain the filtered reconstruction or filtered reconstructed picture $\tilde{X}$, as is specified in equation (1) above. In accordance with the inventive approach, the classifier which, for example, performs best in terms of rate distortion, like minimizing the rate distortion cost, is selected from the plurality of classifiers which have been tested and the classifier is signaled to the decoder together with the encoded data of the image using, for example, the above described classification mode parameter.

Embodiments of the present invention may be implemented in a system including one or more encoders, and one or more decoders, which may be implemented, e.g., in mobile or stationary terminals. FIG. 1 is a schematic representation of a system for communicating video or picture information between an encoder 100 and a decoder 200. The encoder 100 and the decoder 200 may communicate via a wired or wireless communication link for transmitting a data stream 300 including the video or picture information. The encoder 100 includes a signal processor 102 and may operate in accordance with the inventive teachings described herein. The decoder 200 includes a signal processor 202 and may operate in accordance with the inventive teachings described herein.

In accordance with an aspect of the inventive approach, a decoder 200 is provided. The decoder 200 receives as an input the data stream 300, e.g. an encoded data stream from the encoder 100. The encoded data stream 300 includes data representing a picture and a classification mode parameter, and the classification mode parameter specifies a certain classification to be applied to samples in the picture, the certain classification selected from a plurality of classifications. The decoder 200, e.g. using its signal processor 202, decodes the encoded data stream 300 to obtain a reconstructed picture and the classification mode parameter, classifies samples of the reconstructed picture into one of a plurality of classes using the certain classification specified by the classification mode parameter, and filters samples of the reconstructed picture, wherein a sample is filtered using a filter for the class into which the sample has been classified. In accordance with embodiments, the decoder 200 provides as an output 204 the filtered reconstructed picture. In accordance with yet further embodiments the filtered reconstructed picture may also be used for a prediction module of the decoder, which may include a decoded picture buffer to receive the filtered reconstructed picture as an input for the prediction loop.

In accordance with another aspect of the inventive approach, an encoder 100 is provided. The encoder 100 receives as an input 104 an original picture, and, e.g. using its signal processor 102, processes the original picture 104 prior to encoding, and encodes the processed picture into the data stream 300. The encoder 100, e.g. using its signal processor 102, obtains, using the processed picture, a reconstructed picture, performs a plurality of different classifications on samples of the reconstructed picture, and selects from the plurality of different classifications a specific classification which yields the best performance among the plurality of different classifications, e.g., which minimizes the rate distortion cost. The encoder 100 encodes into the data stream 300 the classification mode parameter, and the classification mode parameter indicates the specific classification to be applied to samples in the picture.

In accordance with yet another aspect of the inventive approach, a data stream 300 is provided. The data stream 300 has a picture 302 encoded thereinto and further has a classification mode parameter 304 encoded thereinto. The classification mode parameter 304 specifies a certain classification to be applied at the decoder 200 to samples in the decoded picture. The certain classification is selected from a plurality of classifications.

Figure 2:
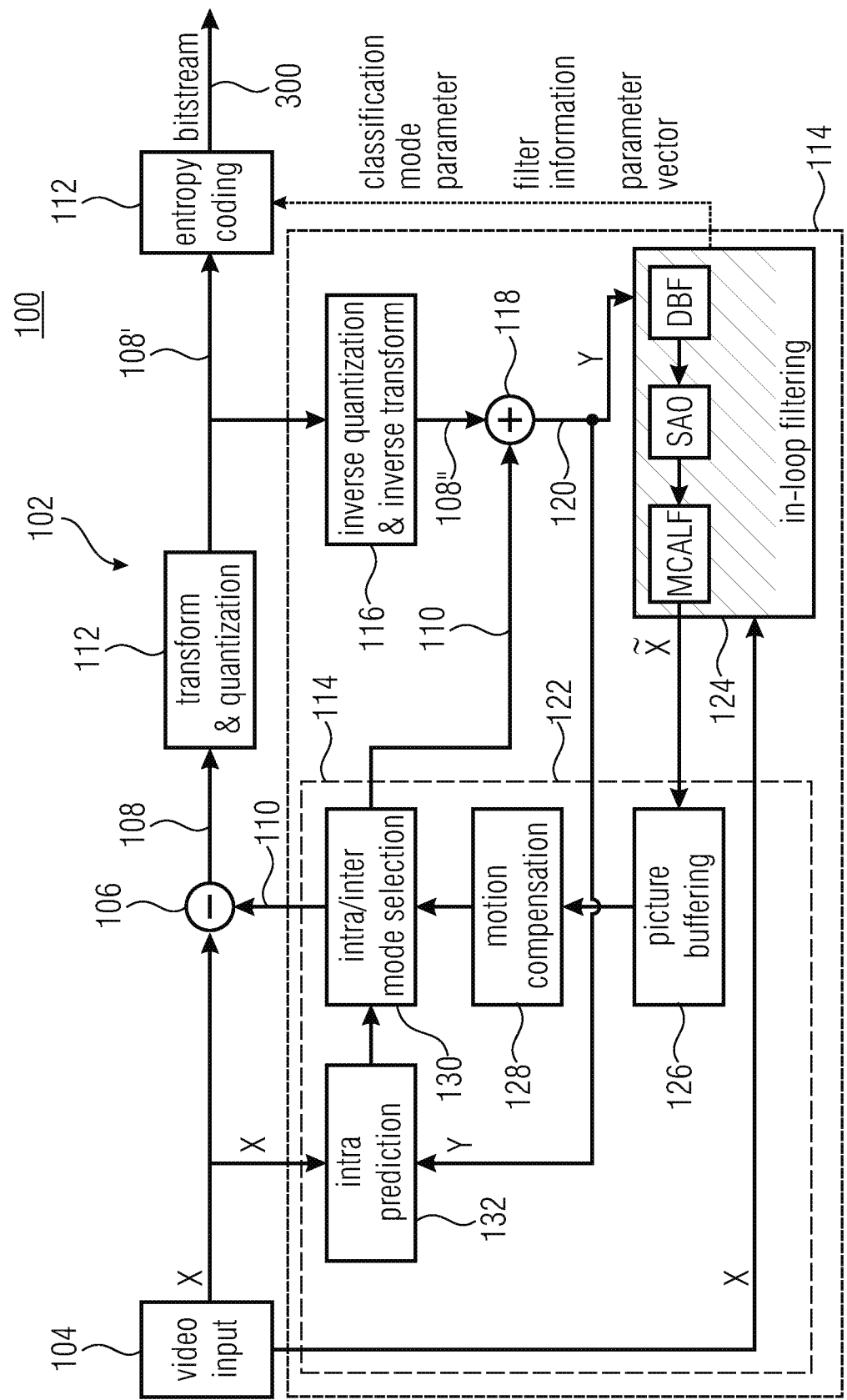
FIG. 2 is a block diagram of an encoder, like a picture encoder or a video encoder implementing the inventive approach in accordance with an embodiment.
Figure 3:
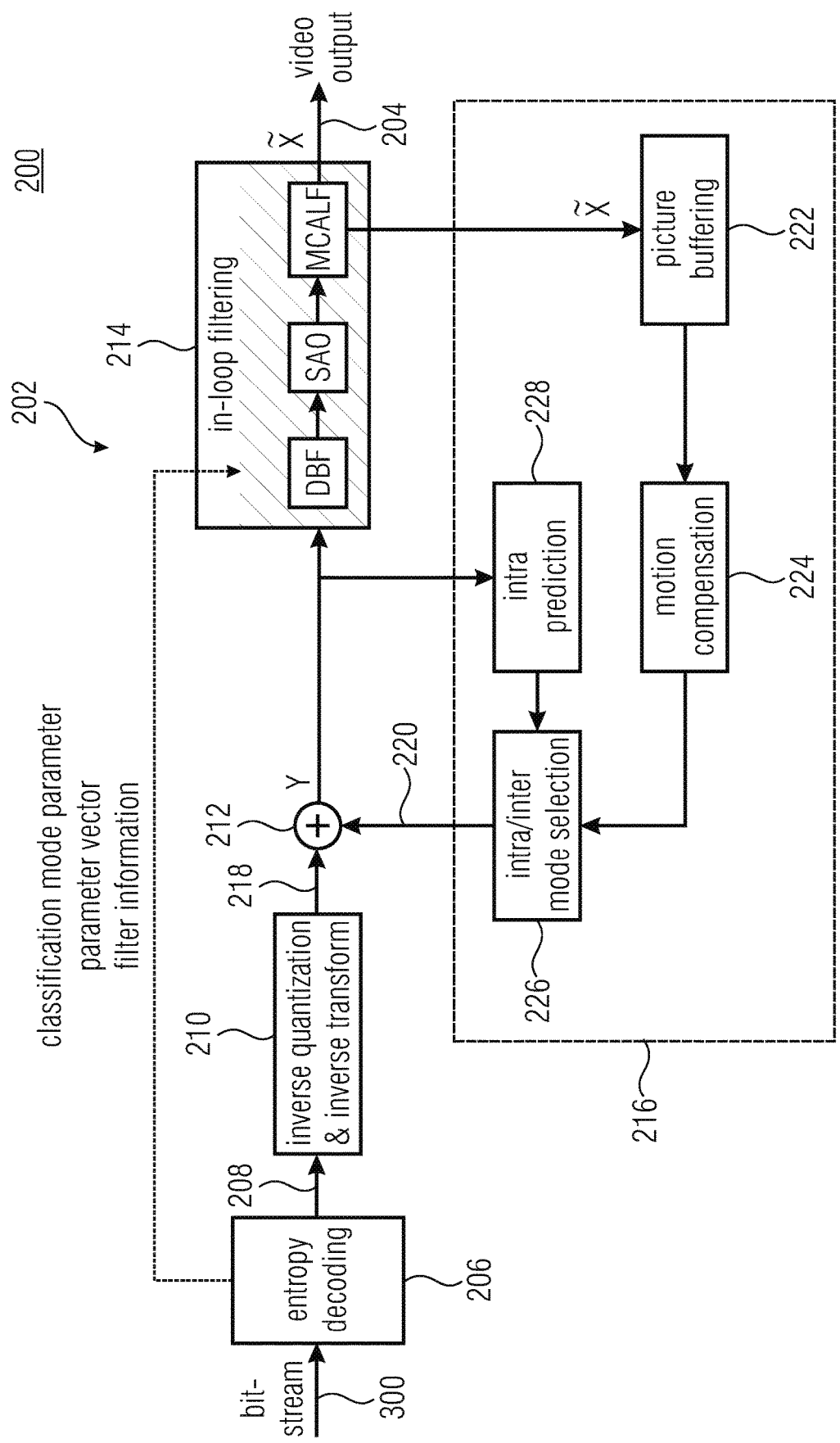
FIG. 3 is a block diagram of a decoder, like a picture decoder or a video decoder implementing the inventive approach in accordance with an embodiment.

More detailed embodiments of the inventive approach will now be described with reference to FIG. 2 and FIG. 3, of which FIG. 2 is a block diagram of an encoder, like a picture encoder or a video encoder implementing the inventive approach, and FIG. 3 is a block diagram of a decoder, like a picture decoder or a video decoder implementing the inventive approach.

FIG. 2 is a block diagram of an encoder 100, e.g., a video encoder, as also shown in FIG. 1. More specifically, FIG. 2 depicts a block diagram of the encoder's 100 signal processor 102 in accordance with an embodiment of the present invention. The encoder 100 receives as an input 104 one or more pictures, e.g., a video input, and predictively codes the picture 104 into the data stream 300 using transform-based residual coding. The encoder 100 subjects a prediction residual signal to a spatial-to-spectral transformation and encodes the prediction residual signal, thus obtained, into the data stream 300. In accordance with embodiments, the encoder 100 comprises a prediction residual signal former 106 which generates a prediction residual signal 108 so as to measure a deviation of a prediction signal 110 from the original signal X, i.e., the picture 104. The prediction residual signal former 106 may, for instance, be a subtractor which subtracts the prediction signal 110 from the original signal X, i.e. the picture 104. The encoder further comprises a transformer/quantizer 112. The transformer subjects the prediction residual signal 108 to a spatial-to-spectral transformation to obtain a spectral-domain prediction residual signal which is then subject to quantization by the quantizer. The thus quantized prediction residual signal 108' is coded into the 300. To this end, the encoder 100 may optionally comprise an entropy coder 112 which entropy codes the prediction residual signal as transformed and quantized into the data stream 300. The prediction residual 110 is generated by a prediction stage 114 of the encoder 10 on the basis of the quantized prediction residual signal 108' decoded into, and decodable from, the data stream 300. To this end, the prediction stage 114 may comprise a dequantizer/inverse transformer 116 which dequantizes the quantized prediction residual signal 108' so as to obtain a spectral-domain prediction residual signal, which corresponds to the signal obtained by the spatial-to-spectral transformation in block 112, except for the quantization loss. The signal is then subjected to an inverse transformation, i.e. a spectral-to-spatial transformation, to obtain the reconstructed prediction residual signal 108″, which corresponds to the original prediction residual signal 108 except for the quantization loss. A combiner 118 of the prediction stage 114 then recombines, such as by addition, the prediction signal 110 and the reconstructed prediction residual signal 108″ so as to obtain a reconstructed signal 120 or Y, i.e. a reconstruction Y of the original signal X. The reconstructed signal Y may correspond to a signal 204 decoded by the decoder 200.

The prediction stage 114 may include an in-loop filter stage 124 coupled to the combiner 118 and receives the reconstructed signal Y. The in-loop filter stage 124 includes a deblocking filter, DBF, to reduce blocking artifacts, a nonlinear sample adaptive offset, SAO, filter to reduce coding artifacts after the DBF, and an adaptive loop filter to minimize the mean square errors between original samples X and reconstructed samples from the SAO filter. The adaptive loop filter is referred to as MCALF and is based on a geometry transformation-based adaptive loop filter, GALF, modified according to the teachings described herein so as to determine which of a plurality of different classifications, performed on samples yields the best performance among the plurality of different classifications, e.g., which minimizes the rate distortion cost.

The in-loop filter stage 124 outputs a filtered reconstructed signal $\tilde{X}$ obtained by filtering using filters in accordance with the selected classification. The in-loop filter stage 124 outputs a classification mode parameter indicating the selected classification, and, in accordance with further embodiments filter information and/or a parameter vector, described later, to the encoder 112 for encoding into the data or bit stream 300.

A prediction module 122 of the prediction stage 114 generates the prediction signal 110 on the basis of the filtered reconstructed signal $\tilde{X}$ by using, for instance, spatial and/or temporal prediction. The prediction module 122 may include a picture buffer 126 receiving and buffering one or more of the filtered reconstructed pictures or signals $\tilde{X}$ provided by the in-loop filter stage 124. The prediction module 122 may further include a motion compensator 128, an intra/inter mode selector 130 and an intra predictor 132. The motion compensator 128 is coupled to the output of the picture buffer 126 and receives a buffered picture to provide for a motion compensation among successive pictures. The intra/inter mode selector 130 is coupled to the output of the motion compensator 128 and provides the prediction signal 110 based on the output of the motion compensator 128 and the output of the intra predictor 132. The intra predictor 132 receives the original signal X and the reconstructed signal Y to output an intra prediction signal to the intra/inter mode selector 130.

At the encoder 100 depicted in FIG. 2, in the in-loop filtering block, more specifically in the MCALF block, the inventive approach may be implemented so that the encoder performs M different classifications, and for each classification corresponding filters, for example Wiener filters or other FIR filters, are determined or computed so as to perform for each classification the reconstruction of the original picture or frame Y in accordance with equation (1) above. From the plurality of different classifications which are performed, one specific classification is selected which minimizes the rate distortion cost among the M classifications, and a set of filter coefficients, like Wiener filter coefficients, and a classification mode parameter ι associated with the selected classification may be coded by the entropy coder, for example a context-based adaptive binary arithmetic coding, CABAC, entropy coder, and may be transmitted together with the encoded image data to the decoder.

Figure 2A:
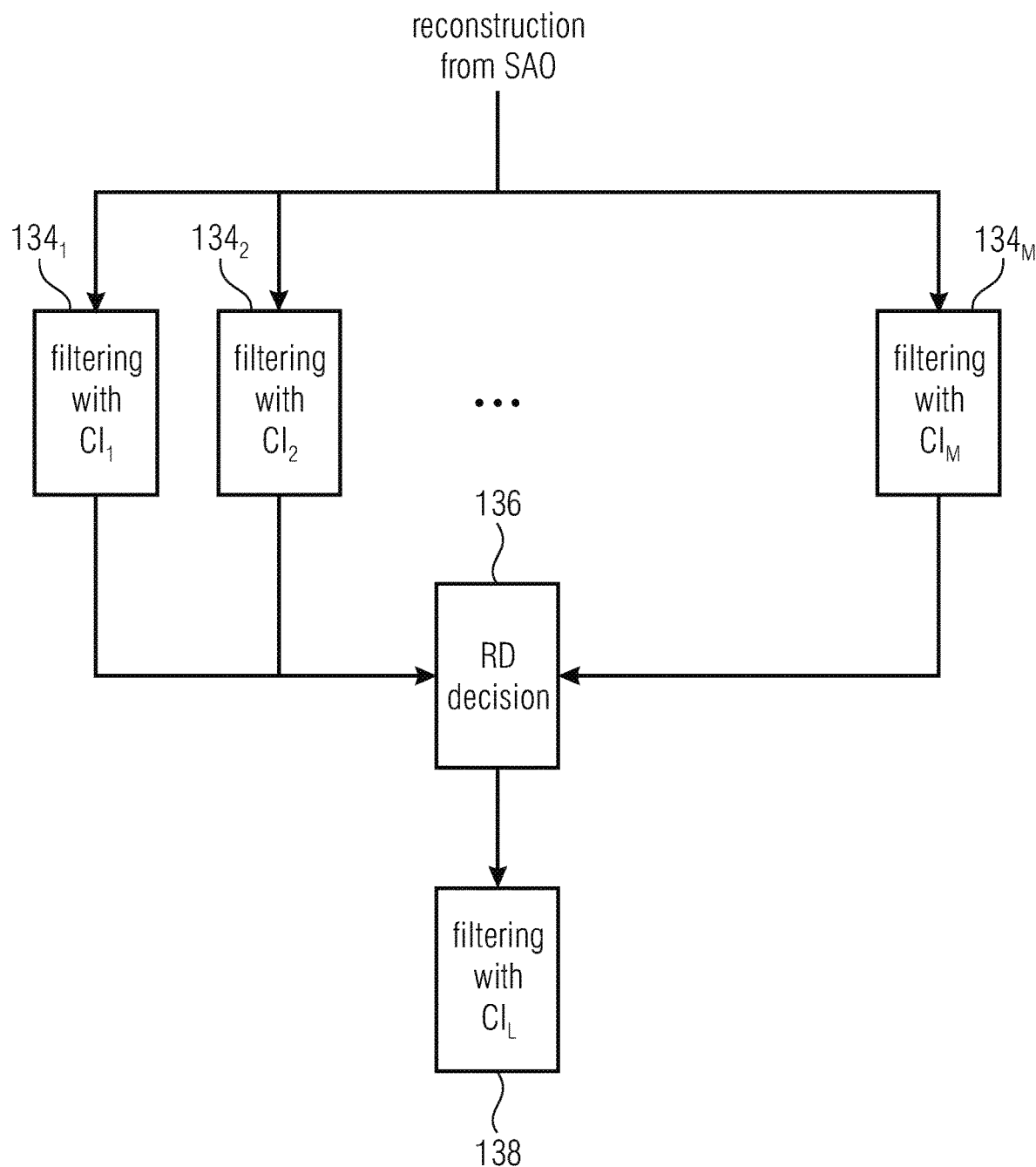
FIG. 2A schematically illustrates the inventive approach in accordance with an embodiment performed, e.g., in the MCALF block in the encoder of FIG. 2.

FIG. 2A schematically illustrates the above described process performed, e.g., in the MCALF block in the encoder 100 of FIG. 2. The filtering is performed with the classifiers $c_{1_1}, \ldots, c_{1_M}$ at blocks $134_1$ to $134_M$ in accordance with equation (1) described above. At the rate distortion, RD, decision at block 136 best RD performing classifier $c_{1_1}$ is determined and provided in block 138 so that, e.g., this classifier $c_{1_1}$ may be signaled to the decoder.

In accordance with embodiments, the M classifications provided by the encoder may be performed on the basis of a respective feature descriptor D. A plurality of such feature descriptors D may be provided on the basis of which the respective different classifications are evaluated at the encoder for determining the one which is most suited for the currently processed picture or image.

In accordance with an embodiment, a first feature descriptor is a pixel based feature descriptor $D_P$ which may take quantized pixel values of the reconstructed image or frame Y as follows:

$$D_P(i,j) = \left\lfloor \frac{(K-1)}{2^B} Y(i,j) \right\rfloor \quad (2)$$

where
$D_P(i,j)$=the sample based feature descriptor for sample (i,j),
Y(i,j)=the sample (i,j) in the reconstructed picture,
K=the number of classes,
B=the input bit depth,
i,j=sample location.

Another embodiment of a feature descriptor is referred to as a ranking base feature descriptor $D_R$ ranking a sample value Y(i,j) in the order of its magnitude when compared to the neighboring samples or pixels. In accordance with embodiments, the ranking base feature descriptor may be defined as follows:

$$D_R(i,j) = |\{(k_1,k_2): Y(i,j) < Y(k_1,k_2) \text{ for } |k_1-i| \leq l, |k_2-j| \leq h\}| \quad (3)$$

where
$D_R(i,j)$=the ranking based feature descriptor for sample (i,j),
Y(i,j)=the sample (i,j) in the reconstructed picture,
$k_1,k_2$=neighboring samples locations,
l,h=width and height of the neighborhood around the sample (i,j) in the reconstructed picture
i,j=sample location.

For example, when considering K=9 classes the ranking based feature descriptor $D_R(i,j)$ ranks a sample value Y(i,j) in the order of its magnitude compared to its neighboring pixels. For example, if $D_R(i,j)$=0, all neighboring pixel locations of (i,j) have a higher magnitude, and if $D_R(i,j)$=8, the location (i,j) has the highest magnitude among its neighbors. As is indicated in the above equation, the ranking descriptor is not limited to a neighborhood including sample or pixel locations immediately adjacent to the sample value (i,j) but may be extended to bigger neighborhoods than just one pixel length. This is indicated by the parameters l,h indicating the size of the neighborhood, for example the pixel lengths in the vertical and horizontal directions by which the neighborhood extends around the sample value or location (i,j). In such a case, the number of classes K will be higher than in the case of a neighborhood having only one pixel length extension. Also, it is noted that the extension in the respective dimensions may be the same, however, in accordance with other embodiments, the parameters l,h may be different so that there is not necessarily a square-shaped neighborhood around the location (i,j).

In addition to the above mentioned descriptors, also descriptors already known in conventional GALF approaches may be employed, for example a Laplacian feature descriptor $D_L$ which is the Laplacian activity-based descriptor used in accordance with the GALF approach and which is described, for example, in reference [4].

In accordance with yet further embodiments, the inventive approach is not limited to only a single feature descriptor to be used for the classification, rather also a plurality of feature descriptors may be employed which may be combined or of which a product may be formed. For example, when considering n feature descriptors described as follows:

$$D_1 = I \rightarrow \{1, \ldots K_1\}$$
$$D_2 = I \rightarrow \{1, \ldots K_2\}$$
$$\vdots$$
$$D_n = I \rightarrow \{1, \ldots K_n\}$$

the combination or product of the n descriptors may be defined as follows:

$$D(i,j) = (D_1(i,j), D_2(i,j), \ldots, D_n(i,j)) \in \{1, \ldots K_1\} \times \{1, \ldots K_2\} \times \ldots \times \{1, \ldots K_n\}$$

where
D(i,j)=combined feature descriptor for sample (i,j) as specified by the classification mode parameter,
$D_n$=feature descriptor n
$K_n$=the number of classes of feature descriptor n,
i,j=sample location,
n=2, 3, . . . .

In accordance with embodiments, any of the above described descriptors or any other known descriptor can be combined in the above described way. For example, when considering two feature descriptors $$D_1 = I \rightarrow \{1, \ldots K_1\}$$
$$D_2 = I \rightarrow \{1, \ldots K_2\}$$

the combination or product of the n descriptors may be defined as follows:

$$D(i,j) = (D_1(i,j), D_2(i,j)) \in \{1, \ldots K_1\} \times \{1, \ldots K_2\}$$

and when considering $D_1 = D_R$, the pixel based feature descriptor described above, $D_2 = D_P$, the above described ranking based feature descriptor, and when assuming that the pixel based feature descriptor $D_P$ provides for K=9 classes and the ranking based feature descriptor $D_R$ provides for K=3 classes, this yields $|\{1, \ldots K_1\} \times \{1, \ldots K_2\}| = 9 \times 3$ since $K_1=9$ and $K_2=3$ in this case, so that, using such a combined descriptor, a classifier providing 27 classes is obtained.

In accordance with the embodiments described so far, classification is performed using one or more of the above referenced feature descriptors specifying specific features of the respective image locations, which has been selected at the encoder for classifying the reconstructed image at the decoder. The information which classifier has been selected is transmitted to the decoder together with the encoded picture or image data.

In accordance with other embodiments, a classification with a confidence level may be used. The confidence level may be provided to indicate for the feature descriptor that a sample location is classified into one estimation class with a confidence or probability exceeding a predefined threshold. For example, the classification given by GALF, as is described in reference [2], is one specific classification, however, this may not be an optimal choice for the classes $\mathcal{C}_1, \ldots, \mathcal{C}_L$ such that the classification provides, e.g., the best possible MSE using the corresponding filters $F_1, \ldots, F_L$, for example respective Wiener filters, among all possible choices for the classes $\mathcal{C}_1, \ldots, \mathcal{C}_L$. In fact, under predefined technical conditions a number of ideal classes $\tilde{C}_1, \ldots, \tilde{C}_n$ exist, for which the best performance improvement or best possible MSE may be achieved. Thus, in accordance with embodiments n optimal or ideal classes $\tilde{C}_1, \ldots, \tilde{C}_n$ may be determined and, at the encoder, initially a feature descriptor D may be provided to pre-classify each pixel location (i,j) into a plurality of pre-classes $\mathcal{C}_1^{pre}, \ldots, \mathcal{C}_K^{pre}$, wherein $D(i,j)=k$ indicates that the sample location i,j is belongs to pre-class $\mathcal{C}_k^{pre}$. It is then determined how accurately the feature descriptor D identifies the pixel locations in the respective ideal classes $\tilde{C}_1, \ldots, \tilde{C}_n$, for example this characterization is performed as follows:

$$p_{k,1} = \frac{|C_k^{pre} \cap \tilde{C}_1|}{|C_k^{pre}|}, p_{k,2} = \frac{|C_k^{pre} \cap \tilde{C}_2|}{|C_k^{pre}|}, \ldots, p_{k,n} = \frac{|C_k^{pre} \cap \tilde{C}_n|}{|C_k^{pre}|},$$

where $p_{k,1}, \ldots, p_{k,n}$=confidence level of the feature descriptor D
k=1, 2, ..., K
K=the number of classes provided by the feature descriptor D,
$\mathcal{C}_k^{pre}$=pre-class into which each sample location i,j is classified using the feature descriptor, wherein $D(i,j)=k$ indicates that the sample location i,j belongs to class $\mathcal{C}_k^{pre}$,
$|\mathcal{C}_k^{pre}|$=number of elements contained in the set $\mathcal{C}_k^{pre}$.

The information concerning the confidence level may be encoded by the encoder, for example, using a parameter vector which specifies for each class of the feature descriptor D having associated therewith the confidence level, one of N states. N=n+1, i.e., N is one more than the number of estimation classes, and the respective states indicate whether a sample location is classified into one estimation class or not. The parameter vector, in accordance with the embodiments, may be determined as follows:

$(P_D(1), \ldots, P_D(K))$ where $$P_D(k) = \begin{cases} 1 & p_{k,1} > p \\ \vdots & \\ n & p_{k,n} > p \\ 0 & \text{otherwise} \end{cases}$$

p=the predefined threshold, like fixed positive constant, e.g., $p \in (0.5/1)$.

In accordance with an embodiment, L=2 filters may be determined to provide for ideal classes, for example as follows:

$\tilde{C}_1 = \{(i,j) \in I : Y(i,j) \leq X(i,j)\}$ $\tilde{C}_2 = \{(i,j) \in I : Y(i,j) > X(i,j)\}$ where I is the set of all pixel locations, (i,j) is the sample location, and X and Y are the processed picture and the reconstructed picture, respectively. For example, ideal class $\tilde{C}_1$ indicates pixels in the reconstructed picture that are smaller than or equal to pixels in the original picture, so that, for example, a filter amplifying the reconstructed picture towards the original value is applied, whereas ideal class $\tilde{C}_2$ assumes that the reconstructed pixel is greater than the original pixel so that, by means of the respective filter, a damping is applied.

For a fixed positive constant $$p \in \left(\frac{0.5}{1}\right)$$

and a given feature descriptor D, a map $P_D$, may be defined as follows:

$$P_D(k) = \begin{cases} 1 & p_{k,1} > p \\ 2 & p_{k,2} > p \\ 0 & \text{otherwise} \end{cases}$$

The a map $P_D$ may be given as a vector $(P_D(1), \ldots, P_D(k))$ of the length K, and, using $P_D$ and D the samples in the estimation class $\mathcal{C}_\ell^e$ may be obtained as follows:

$\mathcal{C}_\ell^e = \{(i,j) \in I : P(D(i,j)) = \ell\}$ for $\ell = 1, 2, \ldots, n$ \hfill (4)

where $\mathcal{C}_\ell^e$=set of samples in estimation class $\ell$,
I=set of all sample locations in the reconstructed picture,
D(i,j)=feature descriptor for sample location (i,j) as specified by the classification mode parameter,
P(D(i,j))=state signaled by parameter vector for sample location (i,j),
n=the number of predefined classes,
i,j=sample location.

In other words, the samples which belong to the estimation class $\mathcal{C}_\ell^e$ are obtained by collecting the pixel or sample locations (i,j) which are classified into one of the ideal classes $\tilde{C}_\ell$ with a sufficient high confidence or a sufficient high probability, for example higher than p, by the selected or given feature descriptor D.

The above described approach may be implemented at the encoder, for example, in the in-loop filtering block, more specifically using the modified GALF block shown in FIG.

2. Thus, in accordance with embodiments, a similar approach as described in reference [2] may be applied, but a different classification algorithm is applied to obtain the classes $C_\ell$, more specifically, in accordance with embodiments, the encoder, in addition, may include a storage, like a memory or the like, holding M different classifications or feature descriptors D with or without confidence level, which are considered in a way as described above to find, for example, the classification which yields the best MSE for a picture currently processed, and this specific classification is then chosen from among the available M different classifications provided at the encoder. For example, M different classifications may be performed at the encoder, and for each classification corresponding filters, like Wiener filters, to perform the reconstruction according to equation (1) for each classification are determined. Once the specific classification which provides the best result, like minimizing the weight distortion cost among the M classifications has been found, the classification mode parameter ι may be transmitted to the decoder. For example, the selected classification may be coded by the entropy coder provided by the encoder shown in FIG. 2.

In accordance with the embodiments using only the feature descriptors without confidence level, only the classification mode parameter ι is encoded into the bit stream transmitting the picture to the decoder. In case the best performing classifier is one using a feature descriptor having associated therewith a confidence level, in addition, the parameters specifying the confidence level will be encoded into the bit stream using also the entropy encoder, for example by encoding into the bit stream the above described parameter vector $(P_D(1), \ldots, P_D(k))$.

In accordance with further embodiments, the filter coefficients may also be available at the decoder, so that dependent on the classification mode parameter ι which is transmitted to the decoder, suitable filter coefficients for the filters may be selected at the decoder side. However, in accordance with further embodiments, the filter coefficients may not be available at the decoder so that, at the encoder, in addition to the classification mode parameter ι, also a set of filter coefficients is determined which is associated with the selected classification, and the filter coefficients are encoded into the bit stream and transmitted to the decoder.

In accordance with further embodiments, to reduce the signaling cost for the filters $F_\ell$, a temporal prediction of previously coded filter coefficients may be used, i.e., the coded filter coefficients may be provided from one or more previously coded pictures. Also, the encoder may apply a class merging algorithm to find the best grouping of classes $C_1, \ldots, C_L$ by trying different versions of merging neighbors based on a rate-distortion-optimization (RDO) process. For example, in one extreme, all classes share one filter, and in the other extreme, each class has its own filter, i.e., L filters for all L classes. For such a filter merging as well as for a filter on/off decision, an approach as described for GALF in references [3] and [4] may be used. In accordance with yet further embodiments, to improve the coding efficiency when temporal prediction is not available, like for intraframes, a set of 16 predefined filters may be assigned to each class, as was done in accordance with the GALF approach described in reference [4]. The predefined filters may be obtained using off-line training. To indicate the usage of the predefined filter, a flag for each class may be signaled and, if used, an index of the chosen predefined filter. Thus, for different classifiers, different sets of predefined filters may be used, and even when the predefined filter is selected for a given class, the coefficient differences between the chosen fixed filter and a desired adaptive filter may be signaled.

The image or picture data which is encoded by the entropy encoder of the encoder of FIG. 2 is transmitted together with the selected classification to the decoder, and the decoder, which may be a picture or video encoder, may have a structure as shown in FIG. 3. FIG. 3 is a block diagram of a decoder 200, e.g., a video decoder, as also shown in FIG. 1. More specifically, FIG. 3 depicts a block diagram of the decoder's 200 signal processor 202 in accordance with an embodiment of the present invention. The decoder 200 predictively decodes from the data stream 300 a picture or video as the output 204. The decoder 200 may also use transform-based residual decoding, and the picture 304 as reconstructed by decoder 200 deviates from picture originally encoded by apparatus 100 in terms of coding loss introduced by a quantization of the original prediction residual signal 108. The decoder 200 may decode the quantized prediction residual signal 108' from the data stream 300 and subject the quantized prediction residual signal 108' thus obtained to a spectral-to-spatial transformation.

The decoder 200 may be internally composed of components corresponding to, and interconnected in a manner corresponding to, the prediction stage 114 of the encoder 100. In particular, the decoder 200 includes an entropy decoder 206 yielding a quantized spectral-domain prediction residual signal 208 from the data stream 300, a dequantizer/inverse transformer 210, a combiner 212, an in-loop filter stage 214 and a prediction module 216.

The dequantizer/inverse transformer 210 dequantizes the prediction residual signal 208 received from the decoder 206 so as to obtain a spectral-domain prediction residual signal. The signal is then subjected to an inverse transformation, i.e. a spectral-to-spatial transformation, to obtain the reconstructed prediction residual signal 218, which, by the combiner 212 is recombined, such as by addition, with a prediction signal 220 so as to obtain the reconstructed signal Y. The in-loop filter stage 214 includes a deblocking filter, DBF, to reduce blocking artifacts, a nonlinear sample adaptive offset, SAO, filter to reduce coding artifacts after the DBF, and an adaptive loop filter to minimize the mean square errors between original samples X and reconstructed samples from the SAO filter. The adaptive loop filter is referred to as MCALF and is based on a geometry transformation-based adaptive loop filter, GALF, modified according to the teachings described herein. More specifically, the in-loop filter stage 214 receives a classification mode parameter ι indicating the classification selected at the encoder 100, and, in accordance with further embodiments filter information and/or a parameter vector, described later. This information may be decoded from the data or bit stream 300 by the decoder 206. Based on the signaled classification and the associated filters, the in-loop filter stage 214 outputs a filtered reconstructed signal $\tilde{X}$ obtained by filtering using filters in accordance with the selected classification.

In accordance with embodiments, the decoder 200 provides as an output 204 the filtered reconstructed signal $\tilde{X}$.

In accordance with In accordance with yet further embodiments the filtered reconstructed signal $\tilde{X}$ may also be used for the prediction module 216 of the decoder 200. The prediction module 216 generates the prediction signal 220 on the basis of the filtered reconstructed signal $\tilde{X}$ by using, for instance, spatial and/or temporal prediction. The prediction module 216 may include a picture buffer 222 receiving and buffering one or more of the filtered reconstructed pictures or signals X̃ provided by the in-loop filter stage 214. The prediction module 216 may further include a motion compensator 224, an intra/inter mode selector 226 and an intra predictor 228. The motion compensator 224 is coupled to the output of the picture buffer 222 and receives a buffered picture to provide for a motion compensation among successive pictures. The intra/inter mode selector 226 is coupled to the output of the motion compensator 222 and provides the prediction signal 220 based on the output of the motion compensator 224 and the output of the intra predictor 228. The intra predictor 228 receives the reconstructed signal Y to output an intra prediction signal to the intra/inter mode selector 226.

Although not specifically described above, it is readily apparent that the encoder 100 may set some coding parameters including, for instance, prediction modes, motion parameters and the like, according to some optimization scheme, e.g., for an optimizing some rate and distortion related criteria. For example, the encoder 100 and the decoder 200, respectively, may support different prediction modes such as intra-coding modes and inter-coding modes. The granularity at which the encoder 100 and the decoder 200 switch between these prediction modes may correspond to a subdivision of the input and output pictures, respectively, into coding segments or coding blocks. In units of these coding segments, for instance, the picture may be subdivided into segments being intra-coded and segments being inter-coded. Intra-coded segments are, for instance, predicted on the basis of a spatial, already coded/decoded neighborhood of the respective segment. Several intra-coding modes may exist and be selected for a respective intra-coded segment including, for instance, directional intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as ADC coding mode, according to which the prediction for the respective intra-coded segment assigns a DC value to all samples within the respective intra-coded segment, and/or a planar intra-coding mode according to which the prediction of the respective segment is approximated or determined to be a spatial distribution of sample values described by a two-dimensional linear function over the sample positions of the respective intra-coded segment. Compared thereto, inter-coded segments may be predicted, for instance, temporally. For inter-coded segments, motion vectors may be signaled within the data stream, the motion vectors indicating the spatial displacement of the portion of a previously coded picture of the video to which picture belongs, at which the previously coded/decoded picture is sampled in order to obtain the prediction signal for the respective inter-coded segment. This means, in addition to the residual signal coding comprised in the data stream 300, such as the entropy-coded transform coefficient levels representing the quantized spectral-domain prediction residual signal 108', data stream 300 may have encoded thereinto coding mode parameters for assigning the coding modes to the various segments, prediction parameters for some of the segments, such as motion parameters for inter-coded segments, and optional further parameters such as parameters controlling and signaling the subdivision of the input and output pictures, respectively, into the segments. The decoder 200 may use these parameters to subdivide the picture in the same manner as the encoder did, to assign the same prediction modes to the segments, and to perform the same prediction to result in the same prediction signal.

In a similar way as the encoder, also the decoder may include some storage holding a plurality of known classifications and, unless explicitly signaled, also filter coefficients, which, responsive to the received information identifying the classification selected at the encoder to apply, during the reconstruction process in accordance with equation (1), the selected classifier.

In other terms, the classification mode parameter $\iota=1, \ldots, M$ that is received at the decoder and that is decoded from the received bit stream specifies the selected classification to be applied and, for example, may be parsed from the bit stream. The selected classification is applied to obtain the classes $C_1, \ldots, C_L$ so that a reconstruction procedure in accordance with reference [2] using the corresponding filters $F_\ell$ may be performed. In case the filter or its filter coefficients is not known at the decoder, it may also be encoded in the bit stream and the filter $F_\ell$ may be parsed from the bit stream.

As mentioned above, in accordance with embodiments, feature descriptors defining the classifiers may be provided without confidence level or with confidence level. In case of an embodiment providing a feature descriptor D without a confidence level, only the information regarding the classification mode parameter $\iota$ is parsed from the bit stream and the classification of the samples using the feature descriptor without confidence level is performed so that:

$$C_\ell = \{(i,j) \in I : D(i,j) = \ell\} \text{ for } \ell = 1, \ldots, K \quad (5)$$

where
$C_\ell$ =set of samples in class $\ell$,
I=set of all sample locations in the reconstructed picture,
D(i,j)=feature descriptor for sample (i,j) as specified by the classification mode parameter,
K=the number of classes,
i,j=sample location.

On the other hand, in case the classification mode parameter $\iota$ identifies a classifier or feature descriptor D with confidence level, the information in the bit stream also includes, for example, the above described parameter vector $(P_D(1), \ldots, P_D(k))$ having the respective values which may be parsed from the bit stream. Initially, the decoder pre-classifies each sample location into the respective pre-classes $C_k^{pre}$ described above using the feature descriptor D signaled by the classification mode parameter $\iota$, and dependent on the received confidence level, for example dependent on the respective values of the parameter vector, the decoder determines whether a pre-class $C_k^{pre}$ is one of the estimation classes or not. Those samples of a reconstructed image, which belong to a pre-class being an estimation class, are filtered using the filters selected, e.g., for the ideal class. For example, using the parameter vector described above, the decoder may perform the classification of the samples using the feature descriptor with a confidence level in accordance with equation (4) above to obtain the samples in an estimation class $C_\ell^e$.

In accordance with embodiments, the additional filters for filtering the samples belonging to a pre-class which is not one of the estimation classes may be obtained by applying a further classification using an additional or further feature descriptor which may be signaled together with the initial feature descriptor for which the confidence level is provided. In other words, in such an embodiment respective sets of samples not belonging to any estimation class $C_\ell^e$ are classified by the further feature descriptor $\tilde{D}$ in the same way as when applying a classifier without confidence level so that a set of samples for the class $C_l$ is obtained as follows $$\mathcal{C}_\ell = \{(i,j) \notin \mathcal{C}_1^e \cup \mathcal{C}_2^e \cup \ldots \cup \mathcal{C}_n^e \cup \tilde{D}(i,j) = \ell\} \text{ for}$$
$$\ell = 1, \ldots, K \quad (6)$$

where
$\mathcal{C}_\ell$ = set of samples in class $\ell$,
$\mathcal{C}_\ell^e$ = estimation class,
I = set of all sample locations in the reconstructed picture,
$\tilde{D}(i,j)$ = further feature descriptor for sample (i,j) as specified by the classification mode parameter,
K = the number of classes,
i,j = sample location.
which yields K+2 classes, namely $C_1^e, C_2^e, C_1, \ldots, C_K$. The further feature descriptor $\tilde{D}$, as mentioned above, may be processed in a way as described above when handling classifiers without confidence level, so that no additional information regarding the second feature descriptor $\tilde{D}$ needs to be parsed from the bit stream.

Thus, in accordance with embodiments, two types of classifications may be applied, and for a classification without confidence level, at the decoder, simply the classification to obtain the set of samples in the specific classes indicated by equation (5) with any of the above described feature descriptors D may be applied. In accordance with embodiments using a classification with confidence level, any pair of descriptors D and $\tilde{D}$ may be used to construct or obtain the set of samples in classes $C_1^e, C_2^e, C_1, \ldots, C_K$ using, for example, equations (4) and (6) above.

The latest video coding standard, i.e. High Efficiency Video Coding (HEVC) and the corresponding reference software, the HEVC Model (HM) is the state-of-art reference used to evaluate coding efficiency of video compression tools. Based on that there was a new reference software developed, the Joint Exploration Model (JEM) which achieves considerable more coding gains compared to HM due to additional integrated tools. One of them is GALF, which has been part of JEM configurations with equal bit rate compared to JEM-7.0 [8].

The coding performance of the inventive approach, also referred to as MCALF, is explained. For the performed simulations NextSoftware was used with JEM-7.0 configuration as the reference first with GALF switched on and second with GALF switched off. The MCALF has been incorporated in GALF and tested on top of JEM-7.0. The test results are conducted for Random Access Main 10 (RA) configuration for the following three sequences: Rollercoaster, BQTerrace and MarketPlace. The quantization factors used in the settings are 27, 32, 37 and 42 while coding efficiency is measured by BD-rate used in JVET [5]. For all test results, five different classifiers were chosen in MCALF as follows:

Classifiers without Confidence Level:
  pixel based feature descriptor $D_P$ to obtain 27 classes $\mathcal{C}_\ell$.
  product of ranking based feature descriptor $D_R$ and pixel based feature descriptor $D_P$ to obtain 27 classes $\mathcal{C}_\ell$.
  Laplacian feature descriptor $D_L$ to obtain 25 classes $\mathcal{C}_\ell$.
Classifiers with confidence level:
  pixel based feature descriptor $D_P$ for classes $\mathcal{C}_1^e$, $\mathcal{C}_2^e$ with p=0:63, K=20 (see equation (5)) and Laplacian feature descriptor $D_L$ for remaining 25 classes $\mathcal{C}_\ell$.
  ranking based feature descriptor $D_R$ for classes $\mathcal{C}_1^e$, $\mathcal{C}_2^e$ with p=0:63, K=9 (see equation (5)) and Laplacian feature descriptor $D_L$ for remaining 25 classes $\mathcal{C}_\ell$.

Table I and Table II show considerable coding gains for those three sequences with moderate complexity increase for the encoder. There is no increase of complexity on decoder side. Even a speed up is possible for the decoder because the fact that chosen classifiers with e.g. ranking based or pixel based descriptors perform less operations than the Laplacian descriptor used in GALF.

TABLE I

CODING GAINS OF MCALF ON TOP OF EXISTING GALF IN JEM-7.0.

| Test Sequence | BD Rate (Y) RA |
|---|---|
| BQTerrace 1920 × 1080 | −1.34% |
| MarketPlace 1920 × 1080 | −0.90% |
| Rollercoaster 3840 × 2160 | −2.33% |
| Encoder run time | 107% |
| Decoder run-time | 100% |

TABLE II

CODING GAINS OF MCALF WITHOUT EXISTING GALF IN JEM-7.0.

| Test Sequence | BD Rate (Y) RA |
|---|---|
| BQTerrace 1920 × 1080 | −5.85% |
| MarketPlace 1920 × 1080 | −3.35% |
| Rollercoaster 3840 × 2160 | −6.31% |
| Encoder run-time | 113% |
| Decoder run-time | 106% |

Naturally other choices of classifiers may further increase bit-rate savings but may increase complexity.

Thus, embodiments of the inventive approach described herein suggest multiple feature-based classifications for an adaptive loop filter framework are proposed. Instead of having only one specific classifier for grouping each reconstructed sample, multiple feature-based classifiers are tested. Classifiers trying to approximate an optimal classifier by calculating confidence level as well as several other ones are proposed. Test results show that for the selected test sequences a coding gain of more than 2% is achievable for RA with an increase of 7% encoding run-time.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 4:
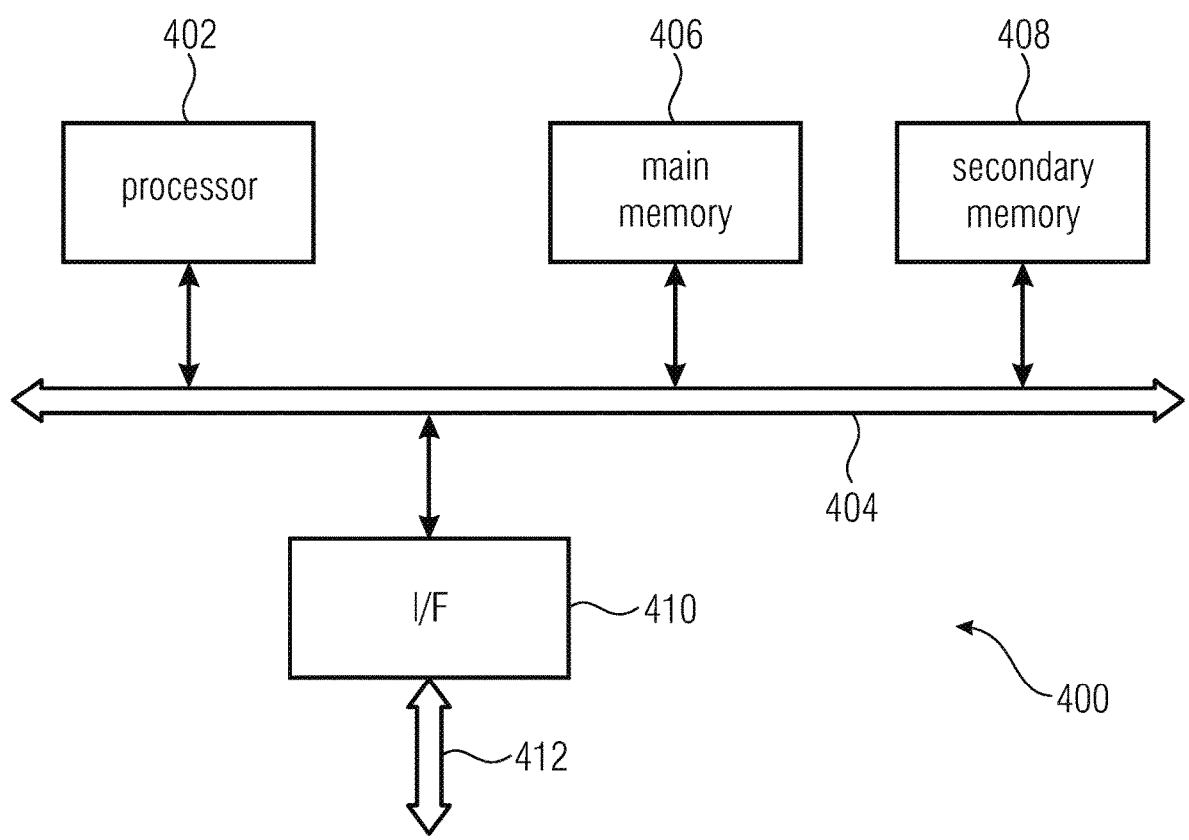
FIG. 4 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 4 illustrates an example of a computer system 400. The units or modules as well as the steps of the methods performed by these units may execute on one or more computer systems 400. The computer system 400 includes one or more processors 402, like a special purpose or a general purpose digital signal processor. The processor 402 is connected to a communication infrastructure 404, like a bus or a network. The computer system 400 includes a main memory 406, e.g., a random access memory (RAM), and a secondary memory 408, e.g., a hard disk drive and/or a removable storage drive. The secondary memory 408 may allow computer programs or other instructions to be loaded into the computer system 400. The computer system 400 may further include a communications interface 410 to allow software and data to be transferred between computer system 400 and external devices. The communication may be in the from electronic, electromagnetic, optical, or other signals capable of being handled by a communications interface. The communication may use a wire or a cable, fiber optics, a phone line, a cellular phone link, an RF link and other communications channels 412.

The terms "computer program medium" and "computer readable medium" are used to generally refer to tangible storage media such as removable storage units or a hard disk installed in a hard disk drive. These computer program products are means for providing software to the computer system 400. The computer programs, also referred to as computer control logic, are stored in main memory 406 and/or secondary memory 408. Computer programs may also be received via the communications interface 410. The computer program, when executed, enables the computer system 400 to implement the present invention. In particular, the computer program, when executed, enables processor 402 to implement the processes of the present invention, such as any of the methods described herein. Accordingly, such a computer program may represent a controller of the computer system 400. Where the disclosure is implemented using software, the software may be stored in a computer program product and loaded into computer system 400 using a removable storage drive, an interface, like communications interface 410.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] P. List, A. Joch, J. Lainema, G. Bjontegaard, and M. Karczewicz, *Adaptive deblocking filter*, IEEE Trans. Circuits Syst. Video Technol. 13 (2003), No. 7.

[2] C.-M. Fu et al., *Sample adaptive offset in the HEVC standard*, IEEE Trans. Circuits Syst. Video Technol. 22 (2012) No. 12.

[3] C.-Y. Tsai et al., *Adaptive Loop Filtering for Video Coding*, IEEE J. Sel. Topics Signal Process 7 (2013), No. 6.

[4] M. Karczewicz, L. Zhang, W. Chien and X. Li, *Geometry transformation-based adaptive in-loop filter*, Picture Coding Symposium (PCS), 2016.

The invention claimed is:

1. A decoder,
wherein the decoder is configured to receive an encoded data stream, the encoded data stream comprising data representing a picture and a classification mode parameter, the classification mode parameter specifying a certain classification to be applied to samples in the picture, the certain classification selected from a plurality of classifications, and wherein the decoder is configured to decode the encoded data stream to acquire a reconstructed picture and the classification mode parameter, to classify samples of the reconstructed picture into one of a plurality of classes using the certain classification specified by the classification mode parameter, and to filter samples of the reconstructed picture, a sample being filtered using a filter for the class into which the sample has been classified, wherein the decoder includes an in-loop filter stage, the in-loop filter stage including a deblocking filter, DBF, to reduce blocking artifacts, a nonlinear sample adaptive offset, SAO, filter to reduce coding artifacts after the DBF, and an adaptive loop filter to minimize the mean square errors between original samples and reconstructed samples from the SAO filter, and wherein the adaptive loop filter is based on a geometry transformation-based adaptive loop filter, GALF, using multiple classifiers, the GALF configured to classify samples of the reconstructed picture into one of a plurality of classes using the certain classification specified by the classification mode parameter.

2. The decoder of claim 1, wherein the classification mode parameter specifies one or more feature descriptors used for the classification of samples of the reconstructed picture.

3. The decoder of claim 2, wherein a feature descriptor describes a predefined feature of a sample and comprises one or more of:
   (i) a Laplacian feature descriptor ($D_L$), which is a Laplacian activity-based descriptor,
   (ii) a sample based feature descriptor ($D_P$), and
   (iii) a ranking based feature descriptor ($D_R$).

4. The decoder of claim 2, wherein the decoder is configured to parse from the encoded data stream the classification mode parameter and to perform the classification of the samples so that:

$$C_l = \{(i,j) \in I : D(i,j) = l\} \text{ for } l=1, \ldots, K$$

where
$C_l$=set of samples in class l,
I=set of all sample locations in the reconstructed picture,
D(i,j)=feature descriptor for sample (i,j) as specified by the classification mode parameter,
K=the number of classes,
i,j=sample location.

5. The decoder of claim 1, wherein
the encoded data stream further comprises data representing the confidence level associated with a feature descriptor specified by the classification mode parameter, and the decoder is configured to acquire from the encoded data stream the confidence level, and
the confidence level indicates for the feature descriptor that a sample location is classified into one or more estimation classes with a confidence or probability exceeding a predefined threshold.

6. The decoder of claim 5, wherein the decoder is configured
to pre-classify each sample location (i,j) into respective pre-classes ($C_1^{pre}, \ldots, C_K^{pre}$) using the feature descriptor D, wherein D(i,j)=k indicates that the sample location i,j belongs to pre-class $C_k^{pre}$, and
to determine, based on the confidence level, whether a pre-class is one of the estimation classes,
wherein samples of the reconstructed picture, which belong to a pre-class being one of the estimation classes, are filtered.

7. The decoder of claim 6, wherein samples of the reconstructed picture, which belong to a pre-class not being one estimation class, are filtered using filters derived from a further classification.

8. An encoder,
wherein the encoder is configured to receive an original picture, to process the original picture prior to encoding, and to encode the processed picture into a data stream,
wherein the encoder is configured to acquire, using the processed picture, a reconstructed picture, to perform a plurality of different classifications on samples of the reconstructed picture, and to select from the plurality of different classifications a specific classification which yields the best performance among the plurality of different classifications,
wherein the encoder is configured to encode into the data stream a classification mode parameter, the classification mode parameter indicating the specific classification to be applied to samples in the picture,
wherein the encoder includes an in-loop filter stage, the in-loop filter stage including a deblocking filter, DBF, to reduce blocking artifacts, a nonlinear sample adaptive offset, SAO, filter to reduce coding artifacts after the DBF, and an adaptive loop filter to minimize the mean square errors between original samples and reconstructed samples from the SAO filter, and
wherein the adaptive loop filter is based on a geometry transformation-based adaptive loop filter, GALF, using multiple classifiers, the GALF configured to perform a plurality of different classifications on samples of the reconstructed picture, and to select from the plurality of different classifications a specific classification which yields the best performance among the plurality of different classifications.

9. The encoder of claim 8, wherein the classification mode parameter specifies one or more feature descriptors used for the classification of samples of the reconstructed picture.

10. The encoder of claim 9, wherein a feature descriptor describes a predefined feature of a sample and comprises one or more of:
   (i) a Laplacian feature descriptor ($D_L$), which is a Laplacian activity-based descriptor,
   (ii) a sample based feature descriptor ($D_P$), and
   (iii) ranking based feature descriptor ($D_R$).

11. The encoder of claim 8, wherein the selected classification uses a feature descriptor with a confidence level, the confidence level indicating for the feature descriptor that a sample location is classified into one estimation class with a confidence or probability exceeding a predefined threshold.

12. The encoder of claim 11, wherein the encoder is configured to determine the confidence level dependent on how accurately the feature descriptor identifies sample locations in the reconstructed picture to belong to one estimation class.

13. The encoder of claim 11, wherein n ideal classes ($\tilde{C}_1, \ldots, \tilde{C}_n$) are selected,
the encoder is configured to determine the confidence level of the feature descriptor which is applied for the reconstructed picture (Y) at each sample location (i,j) as follows:

$$p_{k,1} = \frac{|C_k^{pre} \cap \tilde{C}_1|}{|C_k^{pre}|}, \, p_{k,2} = \frac{|C_k^{pre} \cap \tilde{C}_2|}{|C_k^{pre}|}, \ldots, p_{k,n} = \frac{|C_k^{pre} \cap \tilde{C}_n|}{|C_k^{pre}|},$$

where
$p_{k,1}, \ldots, p_{k,n}$=confidence level of the feature descriptor D
k=1, 2, . . . , K
K=the number of classes provided by the feature descriptor D,
$C_k^{pre}$=pre-class into which each sample location i,j is classified using the feature descriptor, wherein D(i,j)=k indicates that the sample location i,j is belongs to class $C_k^{pre}$, and
the encoder is configured to determine the parameter vector as follows:

$$(P_D(1), \ldots, P_D(K))$$

where $$P_D(k) = \begin{cases} 1 & p_{k,1} > p \\ \vdots & \\ n & p_{k,n} > p \\ 0 & \text{otherwise} \end{cases}$$

p=the predefined threshold, like fixed positive constant.

14. A method, comprising:
receiving an encoded data stream, the encoded data stream comprising data representing a picture and a classification mode parameter, the classification mode parameter specifying a certain classification to be applied to samples in the picture, the certain classification selected from a plurality of classifications,
decoding the encoded data stream to acquire a reconstructed picture and the classification mode parameter,
classifying samples of the reconstructed picture into one of a plurality of classes using the certain classification specified by the classification mode parameter, and
filtering samples of the reconstructed picture, a sample being filtered using a filter for the class into which the sample has been classified,
wherein the decoding employs an in-loop filter stage, the in-loop filter stage including a deblocking filter, DBF, to reduce blocking artifacts, a nonlinear sample adaptive offset, SAO, filter to reduce coding artifacts after the DBF, and an adaptive loop filter to minimize the mean square errors between original samples and reconstructed samples from the SAO filter, and
wherein the adaptive loop filter is based on a geometry transformation-based adaptive loop filter, GALF, using multiple classifiers, the GALF classifying samples of the reconstructed picture into one of a plurality of classes using the certain classification specified by the classification mode parameter.

15. A method, comprising:
receiving an original picture,
processing the original picture prior to encoding,
encoding the processed picture into a data stream,
acquiring, using the processed picture, a reconstructed picture,
performing a plurality of different classifications on samples of the reconstructed picture, and
selecting from the plurality of different classifications a specific classification which yields the best performance among the plurality of different classifications,
wherein a classification mode parameter is encoded into the data stream, the classification mode parameter indicating the specific classification to be applied to samples in the picture,
wherein the encoding employs an in-loop filter stage, the in-loop filter stage including a deblocking filter, DBF, to reduce blocking artifacts, a nonlinear sample adaptive offset, SAO, filter to reduce coding artifacts after the DBF, and an adaptive loop filter to minimize the mean square errors between original samples and reconstructed samples from the SAO filter, and
wherein the adaptive loop filter is based on a geometry transformation-based adaptive loop filter, GALF, using multiple classifiers, the GALF performing a plurality of different classifications on samples of the reconstructed picture, and selecting from the plurality of different classifications a specific classification which yields the best performance among the plurality of different classifications.

16. A non-transitory digital storage medium having stored thereon a computer program for performing, when executed by a computer, a method, comprising:
receiving an encoded data stream, the encoded data stream comprising data representing a picture and a classification mode parameter, the classification mode parameter specifying a certain classification to be applied to samples in the picture, the certain classification selected from a plurality of classifications,
decoding the encoded data stream to acquire a reconstructed picture and the classification mode parameter,
classifying samples of the reconstructed picture into one of a plurality of classes using the certain classification specified by the classification mode parameter, and
filtering samples of the reconstructed picture, a sample being filtered using a filter for the class into which the sample has been classified,
wherein the decoding employs an in-loop filter stage, the in-loop filter stage including a deblocking filter, DBF, to reduce blocking artifacts, a nonlinear sample adaptive offset, SAO, filter to reduce coding artifacts after the DBF, and an adaptive loop filter to minimize the mean square errors between original samples and reconstructed samples from the SAO filter, and
wherein the adaptive loop filter is based on a geometry transformation-based adaptive loop filter, GALF, using multiple classifiers, the GALF classifying samples of the reconstructed picture into one of a plurality of classes using the certain classification specified by the classification mode parameter.

17. A non-transitory digital storage medium having stored thereon a computer program for performing, when executed by a computer, a method, comprising:
receiving an original picture,
processing the original picture prior to encoding,
encoding the processed picture into a data stream,
acquiring, using the processed picture, a reconstructed picture,
performing a plurality of different classifications on samples of the reconstructed picture, and
selecting from the plurality of different classifications a specific classification which yields the best performance among the plurality of different classifications,
wherein a classification mode parameter is encoded into the data stream, the classification mode parameter indicating the specific classification to be applied to samples in the picture,
wherein the encoding employs an in-loop filter stage, the in-loop filter stage including a deblocking filter, DBF, to reduce blocking artifacts, a nonlinear sample adaptive offset, SAO, filter to reduce coding artifacts after the DBF, and an adaptive loop filter to minimize the mean square errors between original samples and reconstructed samples from the SAO filter, and
wherein the adaptive loop filter is based on a geometry transformation-based adaptive loop filter, GALF, using multiple classifiers, the GALF performing a plurality of different classifications on samples of the reconstructed picture, and selecting from the plurality of different classifications a specific classification which yields the best performance among the plurality of different classifications.

* * * * *